(12) United States Patent
Marzy et al.

(10) Patent No.: US 7,506,628 B2
(45) Date of Patent: Mar. 24, 2009

(54) BALANCING SHAFT UNIT AND ASSOCIATED BEARING

(75) Inventors: Roland Marzy, Steyr (AT); Michael Messing, Sierning (AT); Ewald Sieberer, Steinbach (AT)

(73) Assignee: Magna Drivetrain AG & Co KG, Lannach (AT)

( * ) Notice: Subject to any disclaimer, the term of this patent is extended or adjusted under 35 U.S.C. 154(b) by 72 days.

(21) Appl. No.: 11/666,906

(22) PCT Filed: Nov. 8, 2005

(86) PCT No.: PCT/AT2005/000445

§ 371 (c)(1),
(2), (4) Date: Jul. 31, 2007

(87) PCT Pub. No.: WO2006/072118

PCT Pub. Date: Jul. 13, 2006

(65) Prior Publication Data

US 2007/0261657 A1  Nov. 15, 2007

(30) Foreign Application Priority Data

Nov. 8, 2004  (AT)  ................................ 804/2004 U

(51) Int. Cl.
*F02B 75/06*  (2006.01)
(52) U.S. Cl. .................................................. 123/192.2
(58) Field of Classification Search .............. 123/192.2; 74/604
See application file for complete search history.

(56) References Cited

U.S. PATENT DOCUMENTS

| | | | |
|---|---|---|---|
| 4,819,505 A | 4/1989 | Takubo et al. | |
| 6,189,499 B1 | 2/2001 | Iwata et al. | |
| 6,305,339 B1 | 10/2001 | Iwata et al. | |
| 6,581,495 B2 * | 6/2003 | Cagney et al. | ................. 74/603 |
| 6,655,340 B2 * | 12/2003 | Garza | ...................... 123/192.2 |
| 6,772,725 B2 * | 8/2004 | Inaba et al. | .............. 123/192.2 |
| 7,444,976 B2 * | 11/2008 | Hofheinz et al. | ......... 123/192.2 |
| 2004/0079316 A1 | 4/2004 | Lawrence | |
| 2004/0084006 A1 | 5/2004 | Lawrence | |

FOREIGN PATENT DOCUMENTS

| | | |
|---|---|---|
| DE | 32 11 655 A1 | 10/1983 |
| DE | 37 05 346 A1 | 8/1987 |
| DE | 10 007 660 A1 | 8/2001 |
| EP | 1 065 359 A2 | 1/2001 |
| EP | 1 081 410 A1 | 3/2001 |
| GB | 2 117 837 A | 10/1983 |

* cited by examiner

*Primary Examiner*—Hai H Huynh
(74) *Attorney, Agent, or Firm*—Harness, Dickey & Pierce, P.L.C.

(57) ABSTRACT

The invention relates to a balancing shaft unit for piston machines, in particular internal combustion engines, for installation in a housing with non-divided bearing seats. Said shaft unit consists of at least one balancing shaft, which is configured as one piece with its balancing weight or weights. To allow the shaft unit to be installed in a non-divided housing without any restrictions being placed on its bearing, at least one bearing of the balancing shaft is formed by a narrowing of the balancing shaft that acts as a bearing journal and by a sub-divided bearing ring that is fixed to the housing, whose external diameter is greater than the external diameter of the balancing weight or weights.

4 Claims, 2 Drawing Sheets

BALANCING SHAFT UNIT AND ASSOCIATED BEARING

CROSS-REFERENCE TO RELATED APPLICATIONS

This application is a National Stage of International Application No. PCT/AT2005/000445, filed Nov. 8, 2005, and which claims the benefit of Austrian Utility Model Application No. GM 804/2004, filed Nov. 8, 2004. The disclosures of the above applications are incorporated herein by reference.

FIELD

The invention relates to a balance shaft unit for piston engines, in particular internal combustion engines, for installation in a housing with non-split bearing seats, with at least one balance shaft being integral with at least one balance weight.

BACKGROUND

The statements in this section merely provide background information related to the present disclosure and may not constitute prior art.

Balance shafts are used to balance free forces of inertia or free mass moments of inertia; in in-line engines with four cylinders, the forces of inertia of the second order. For this purpose, two balance shafts are required which rotate in opposite senses at twice the speed of the crankshaft.

Balance shafts are either accommodated in a separate housing which is fastened in the base engine or to the crankshaft bearings. Or their housing is part of the crankcase or of the engine block. An integrated balance shaft unit is then spoken of. It is known to split the respective housing or the respective housing part to be able to install the balance shafts easily and precisely. This is above all unfavorable with the integrated design because it weakens the crankcase or the engine block respectively. To avoid this, it is also known to configure the balance weights as separate components and then to thread them into a non-split housing on the installation of the balance shaft.

It is known from DE 32 11 655 A1 for a shaft with an integral balance weight to configure a second flying balance weight separately. It is first assembled after the shaft has been pushed through a non-split bearing. The second bearing is in a bearing flange which has to be assembled together with the shaft. This construction is complex and difficult to assemble. However, it above all brings about construction limitations or it requires large bearing spacings. Finally, the flying arrangement of a balance weight is not always favorable.

These disadvantages are avoided in the solution known from DE 37 05 346 A1; however, at the price of large bearing diameters. The diameter of the bearing journals of the shaft is namely larger there than the diameter of the balance weights so that the balance shaft can be pushed in the direction of its axis. If one remembers that the balance shaft reaches five-digit revolution speeds in a high-revving four-cylinder engine, it can be recognized that huge speeds occur in the lubrication gap which, if they can be controlled at all, result in considerable friction losses.

SUMMARY

It is therefore the object of the invention to provide a solution which does not have the mentioned disadvantages. An improved balance shaft should be integral with its balance weights, but nevertheless be able to be installed in a non-split housing without restrictions with respect to its bearing arrangement.

This is achieved in accordance with the invention in that at least one bearing arrangement of the balance shaft is formed by a waist of the balance shaft as a bearing journal and by a split bearing ring which is fixed to the housing and whose outer diameter is larger than the outer diameter of the balance weights. The balance shaft can thus be pushed together with its bearing ring or together with its bearing rings into the housing from one side after the parts of the bearing ring have previously been placed around the waist. The balance shaft can thereby be made cost-effectively, because integrally, and can be supplied ready for installation as an assembly. The main advantage consists of the bearing diameter being able to be kept small thanks to the waist, whereby smaller peripheral speeds occur in the bearing gap and the friction losses are considerably reduced.

The bearing ring is preferably split into two half-rings whose contact surfaces have positioning means, preferably at least one bore for a register pin. The positioning means hold the two half-rings together during the pushing into the housing and provide an exact position of the half-rings with respect to one another.

In a particularly advantageous embodiment, the outer diameter of the bearing ring is dimensioned such that it is smaller than the diameter of the bearing seat in the housing in the cryogenic state and is firmly seated in the latter at a normal temperature. The pre-assembled unit can thus be inserted into the respective housing without the application of force, even by means of robots, and does not require any further fixing. The balance shaft unit in accordance with the invention can be accommodated in a separate non-split balance housing or as a tunnel in the engine block or in the crankcase. The advantages of the invention come into effect particularly well in the latter case.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
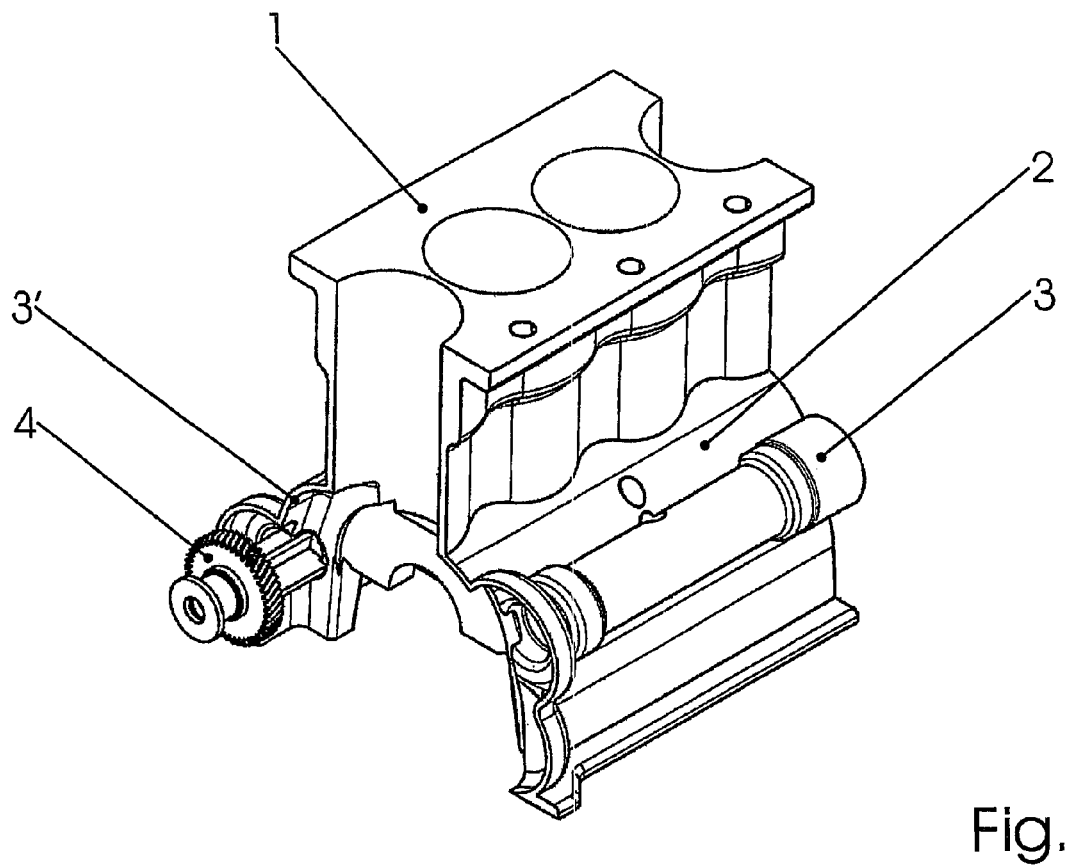
FIG. 1 illustrates an engine block into which balance shaft units in accordance with the invention are to be installed.

The following description is merely exemplary in nature and is not intended to limit the present disclosure, application, or uses. It should be understood that throughout the drawings, corresponding reference numerals indicate like or corresponding parts and features.

In FIG. 1, an engine block 1 and an upper crankcase part 2 are only indicated; both are integral here. A housing 3, 3' for a balance shaft unit in accordance with the invention is seated at both sides on the upper crankcase part 2. The housing 3 is shown without content as a tunnel which is only accessible from one side, the viewing side. It is indicated in the other housing 3' that a balance shaft in accordance with the invention, of which only a drive toothed wheel 4 can be clearly recognized, is just being introduced into the housing 3'. The housing for a balance shaft unit in accordance with the invention can just as easily be an independent housing for a pair of balance shafts that is fastened to intermediate walls in the crankcase or to covers of the crankshaft bearings in a known manner.

Figure 2:
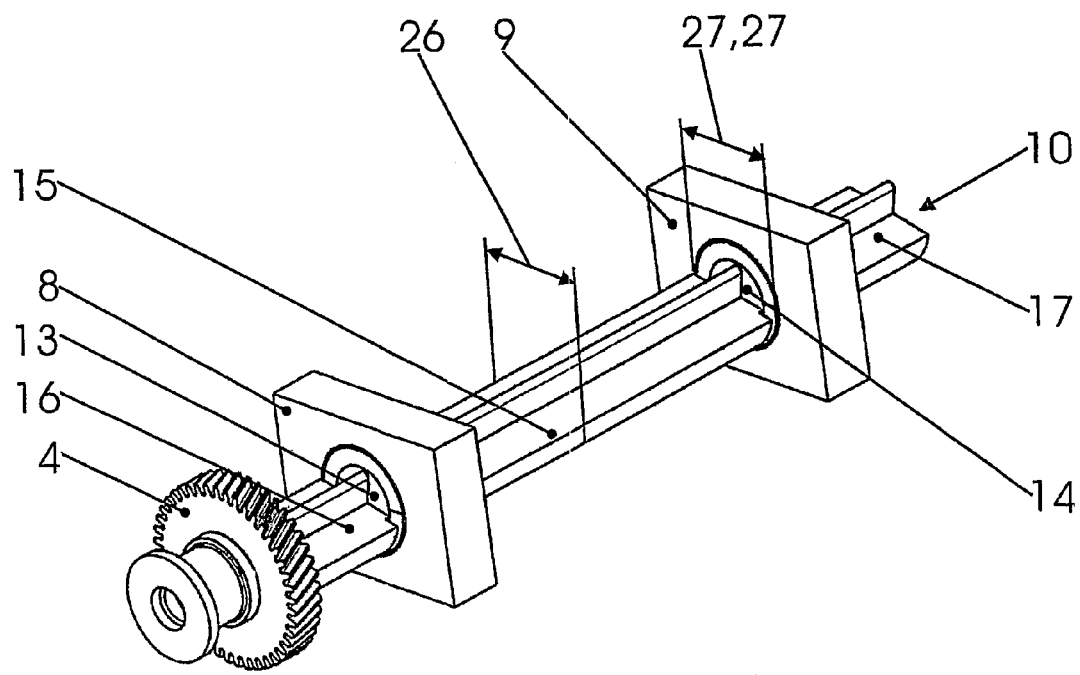
FIG. 2 illustrates a balance shaft in accordance with the invention in the installed state.

In FIG. 2, only the housing parts 8, 9 forming a bearing seat of the housing, of whatever type, are still shown. Only the circular contour of the bearing seat itself can be seen, with a cylindrical surface at the interior of the housing parts 8, 9 having the diameter 27 corresponding to said contour. The two housing parts 8, 9 thus contain the bearing arrangement of a balance shaft 10 summarily designated by 11 and 12 in FIG. 3.

The balance shaft 10 comprises at least one first cylindrical waist 13, a second cylindrical waist 14 and a first balance weight 15 between them. The waists 13, 14 form the bearing surfaces of the balance shaft 10; their diameter is substantially smaller than the outer diameter 26 of the at least one balance weight 15 which is integral with the balance shaft 10. In the embodiment shown, the balance shaft 10 has two further balance weights 16, 17 at the outer side of the bearing arrangements 11, 12.

Figure 3:
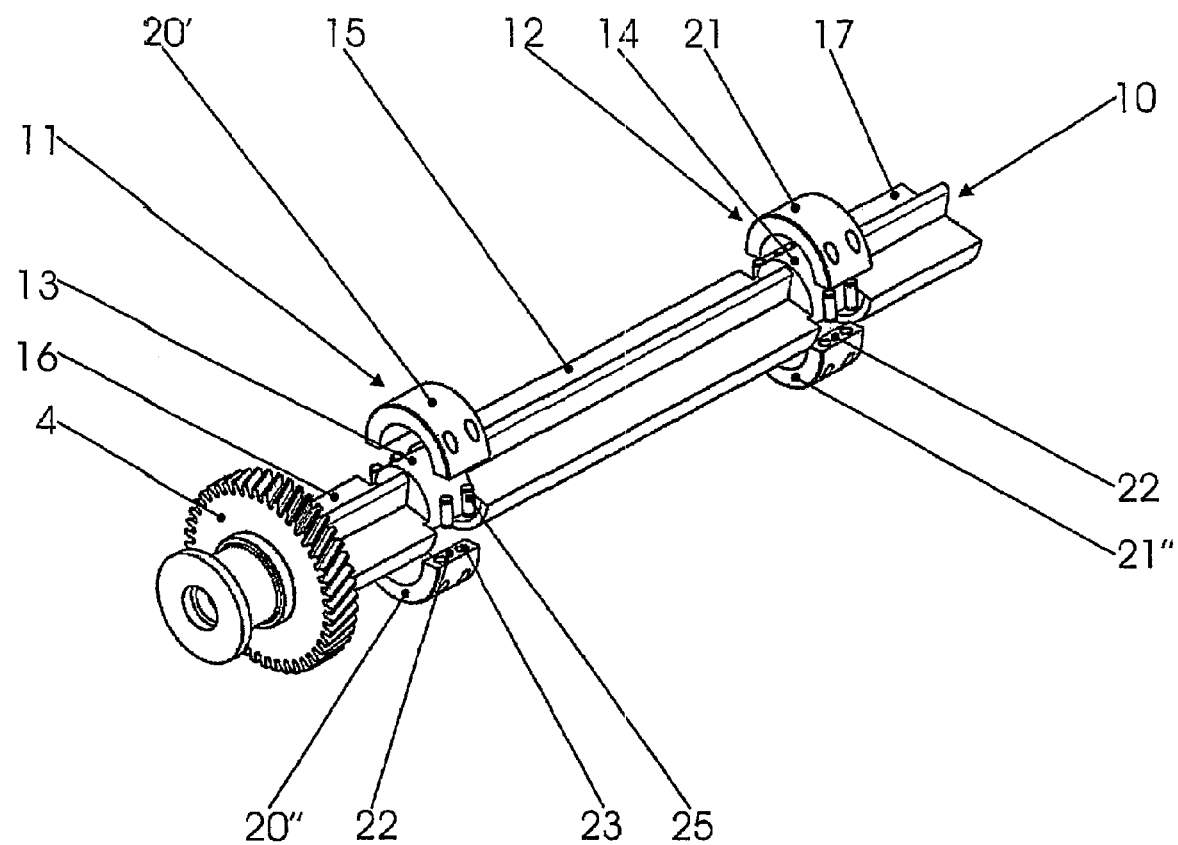
FIG. 3 illustrates the same balance sheet unit before the installation.

A first bearing ring 20 and a second bearing ring 21 are shown in exploded form in FIG. 3. It here comprises two half-rings each 20', 20" and 21', 21". Their outer diameter 28 corresponds approximately (see below) to the inner diameter 27 of the bearing seat. Since the diameter of the waists 13, 14 is substantially smaller, the bearing rings 20, 21 can be very powerfully dimensioned. They could also be called very thick support shells. The half-rings each have contact surfaces 22 having bores 23 into which the pins 25 fit.

For the assembly and the subsequent installation of the balance shaft unit, the half-rings 20', 20" and 21', 21" are laid around the respective waist 13, 14 of the balance shaft 10 and are plugged together by means of the register pins 25. The bearing rings 20, 21 now surround the balance sheet 10 and project beyond the contour of the balance weights 15, 16, 17.

The balance shaft unit put together in this manner can thereby be pushed into its housing 8, 9, no matter what type it is. This is done either by pressing in or, even better and more gently, by undercooling the total balance shaft unit, that is the balance shaft 10 with its bearing rings 20, 21. In the first case, the oversize of the outer diameter 28 of the bearing rings is dimensioned such that the pushed-in bearing rings 20, 21 are firmly seated in their bearing seats. In the second case, the balance shaft unit can be simply pushed in; the firm seating of the bearing rings 20, 21 in the bearing seats is established as soon as the balance shaft unit has again reached a normal temperature.

The description is merely exemplary in nature and, thus, variations that do not depart from the gist of the present disclosure are intended to be within the scope of the invention. Such variations are not to be regarded as a departure from the spirit and scope of the present disclosure.

The invention claimed is:

1. A balance shaft unit for piston engines, in particular internal combustion engines, for installation into a housing having non-split bearing seats, with at least one balance shaft being integral with its at least one balance weight, wherein at least one bearing arrangement of the balance shaft is formed by a waist of the balance shaft as a bearing journal and by a split bearing ring, which is fixed to the housing and whose outer diameter is larger than the outer diameter of the balance weight or weights.

2. A balance shaft unit in accordance with claim 1, wherein the bearing ring is split into two half-rings whose contact surfaces have positioning means, preferably at least one bore for a register pin.

3. A balance shaft unit in accordance with claim 1, wherein the outer diameter of the bearing ring is dimensioned such that it is smaller in the cryogenic state than the inner diameter of the bearing seat in the housing and is firmly seated in the latter at a normal temperature.

4. A balance shaft unit in accordance with claim 1, wherein the housing is a substantially cylindrical tunnel in the engine block or in the crankcase of the piston engine.

* * * * *